DIGITAL COMPUTER AND GRAPHIC INPUT SYSTEM

Filed June 29, 1964 3 Sheets-Sheet 1

INVENTORS
THOMAS O. ELLIS
MALCOLM R. DAVIS
BY Fulwider, Patton, Rieber, Lee, and Utecht
ATTORNEYS

DIGITAL COMPUTER AND GRAPHIC INPUT SYSTEM

Filed June 29, 1964 3 Sheets-Sheet 2

INVENTORS
THOMAS O. ELLIS
MALCOLM R. DAVIS
BY
Fulwider, Patton, Rieber, Lee, and Utecht
ATTORNEYS

DIGITAL COMPUTER AND GRAPHIC INPUT SYSTEM

Filed June 29, 1964 3 Sheets-Sheet 3

INVENTORS
THOMAS O. ELLIS
MALCOLM R. DAVIS
BY Fulwider, Patton, Rieber
Lee, and Utecht
ATTORNEYS

United States Patent Office 3,399,401

Patented Aug. 27, 1968

3,399,401

DIGITAL COMPUTER AND GRAPHIC INPUT SYSTEM

Thomas O. Ellis, Palos Verdes Estates, and Malcolm R. Davis, Woodland Hills, Calif., assignors, by mesne assignments, to the United States of America as represented by the Secretary of the Army

Filed June 29, 1964, Ser. No. 378,786

11 Claims. (Cl. 340—324)

ABSTRACT OF THE DISCLOSURE

The present invention relates generally to graphic communication with a digital computer and more particularly to a digital computer and graphic input system employing a graphic input device of the tablet-stylus type in which the position of a writing stylus with respect to a tablet "writing" surface is given by digital signals representative of the coordinates of the position of the stylus on the tablet surface. In one embodiment, the present invention includes a device for generating electronic digital signals representing hand generated graphic data, such as writing and drawing.

For communicating with digital computers, graphic input devices are known in which a "light pen" containing a light sensor is moved across the surface of a cathode ray tube which forms a tablet surface. Such systems suffer from the poor resolution and surface linearity inherent in a cathode ray tube system. Various mechanically coupled, position transducer devices have also been used as graphic input devices, but friction and inertial limitations are undesirable, as is the required stylus design. Attempts have also been made to use magnetic induction devices for graphic input, but these involve mechanical and electrical difficulties in the energization of the magnetic fields and restrictions on the free movement of the sensing stylus pick-up. Other tablet arrangements, including electrolytic and resistive sheet devices have presented similar problems and undesirable limitations.

In the system of the present invention, the graphic input device employs a pen-like stylus which senses signals, serially encoded in time, from the surface of a "wire" screen representing a tablet. The encoding of the signals is representative of the coordinate position of the stylus on the screen surface. The stylus in a preferred embodiment includes a high input impedance amplifier which is capacitatively coupled to the wire screen. The wires or conductors of the screen run in superposed relation in X and Y axis directions and are separately driven in succession to give both X and Y coordinates of the position of the coupled stylus with respect thereto.

Each axial set of screen conductors is driven by a plurality of pairs of drive lines independently and capacitatively coupled to the screen conductors according to a desired coding. The drive lines of each pair are energized simultaneously with positive and negative pulses, and the pairs are energized in rapid succession to couple to each X and Y wire a unique pulse code to give a complete digital determination of the position of the stylus on the tablet. The stylus signals, after proper sampling and shaping, are assembled in a shift register for transfer to a digital computer.

In one form of the tablet screen, the drive lines are desirably capacitatively coupled to the tablet conductors in accordance with the selected coding, with the encoding surfaces which capacitatively couple to the lower set of coordinate conductors having a greater area than those coupling to the upper set of conductors whereby the signal strength of the lower conductors will be increased to compensate for the loss at the tablet surface due both to their greater distance from the stylus pick-up and the shielding effect of the upper conductors. It may be desirable to increase the coupling area, both in upper and lower conductor coupling, in the phase or phases in which the bit values changes more frequently with screen position to increase the signal strength against local cancelling from adjacent conductors.

In the system of this invention the graphic device is connected to feed to a digital computer for both temporary and permanent storage therein, as programmed. The stylus and computer outputs may be connected to a cathode ray tube adjacent the tablet to present a view to the user of either or both a point representation of the instantaneous position of the stylus on the tablet and, when the cathode ray tube is fed from the computer, a representation of what has been graphically traced on the tablet by the stylus.

It is, therefore, an object of the present invention to provide an improved digital computer and graphic input system.

Another object of this invention is the provision of an improved digital computer system having a graphic input from an electrical tablet and stylus pick-up and a local cathode ray tube adjacent the tablet presenting a view of the analog path of the stylus and the tablet.

Another object of this invention is the provision of an improved digital computer and graphic input system of increased linearity and accuracy.

Another object of this invention is the provision of an improved digital input device employing a stylus and tablet in increased linearity and resolution.

A further object of the present invention is the provision of a graphic input device which may be used in a natural manner in writing and drawing while communicating digitally with a computer and supplying a visual picture of the graphic movements.

A still further object of this invention is the provision of an improved tablet and stylus input device for generating electronic digital signals giving a complete and unambiguous representation of hand generated graphic data.

Yet another object of this invention is the provision of an improved device for generating electronic digital signals from hand generated graphic data employing a tablet with parallel insulated X and Y conductors, the conductors in each axis being capacitatively coupled to drive lines according to a binary code and employing a stylus capacitatively coupled to the tablet conductors to sense the energization thereof.

These and other objects and features of the invention will be readily apparent to those skilled in the art from the following specification and the appended drawing in which.

Figure 5:
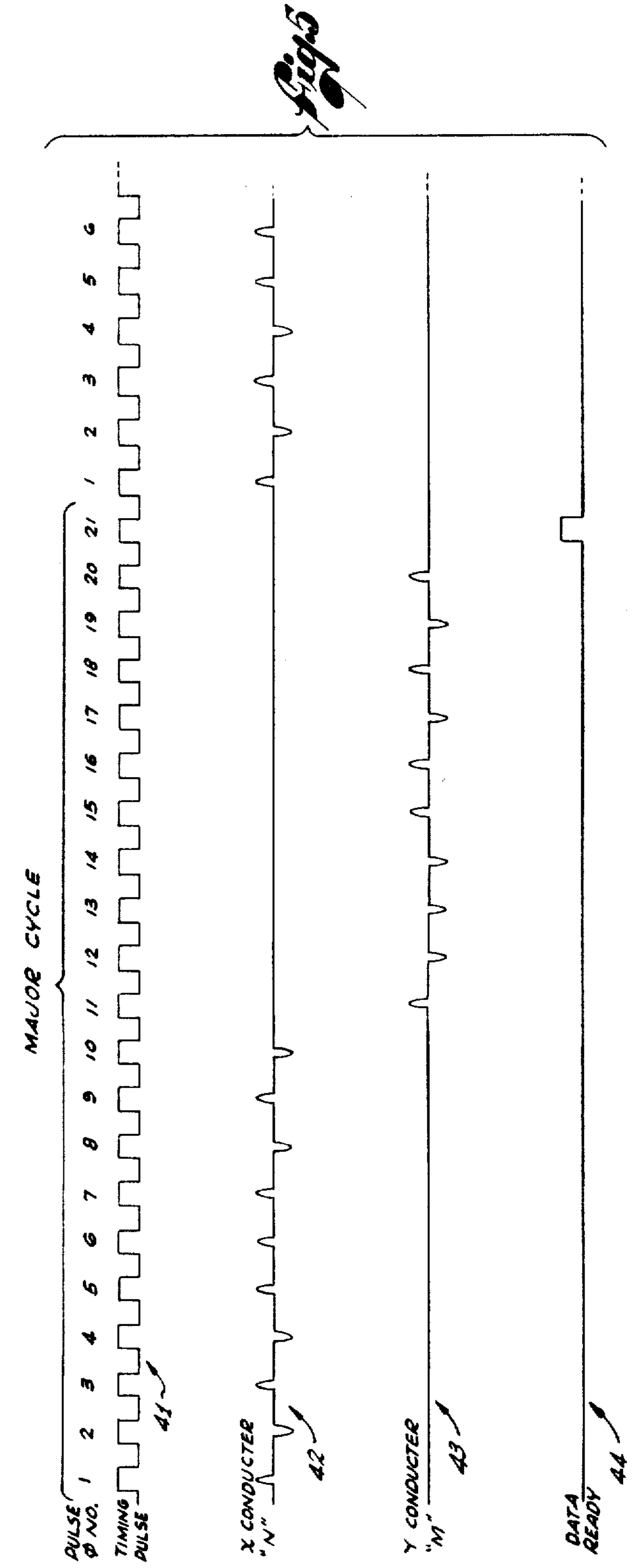
Figure 4A:
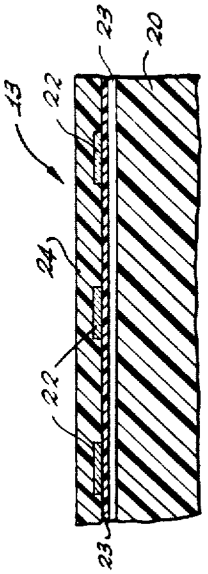
FIGURE 4 is a greatly enlarged detail sectional view through the tablet at 4—4 of FIGURE 3.
Figure 4:
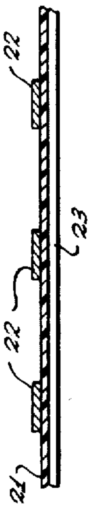

FIGURE 4*a* is a view similar to FIGURE 4 with the tablet mounted and provided with a wear surface; and FIGURE 5 is an idealized representation of tablet conduction energizing pulses over a scanning cycle.

Figures 1, 2:
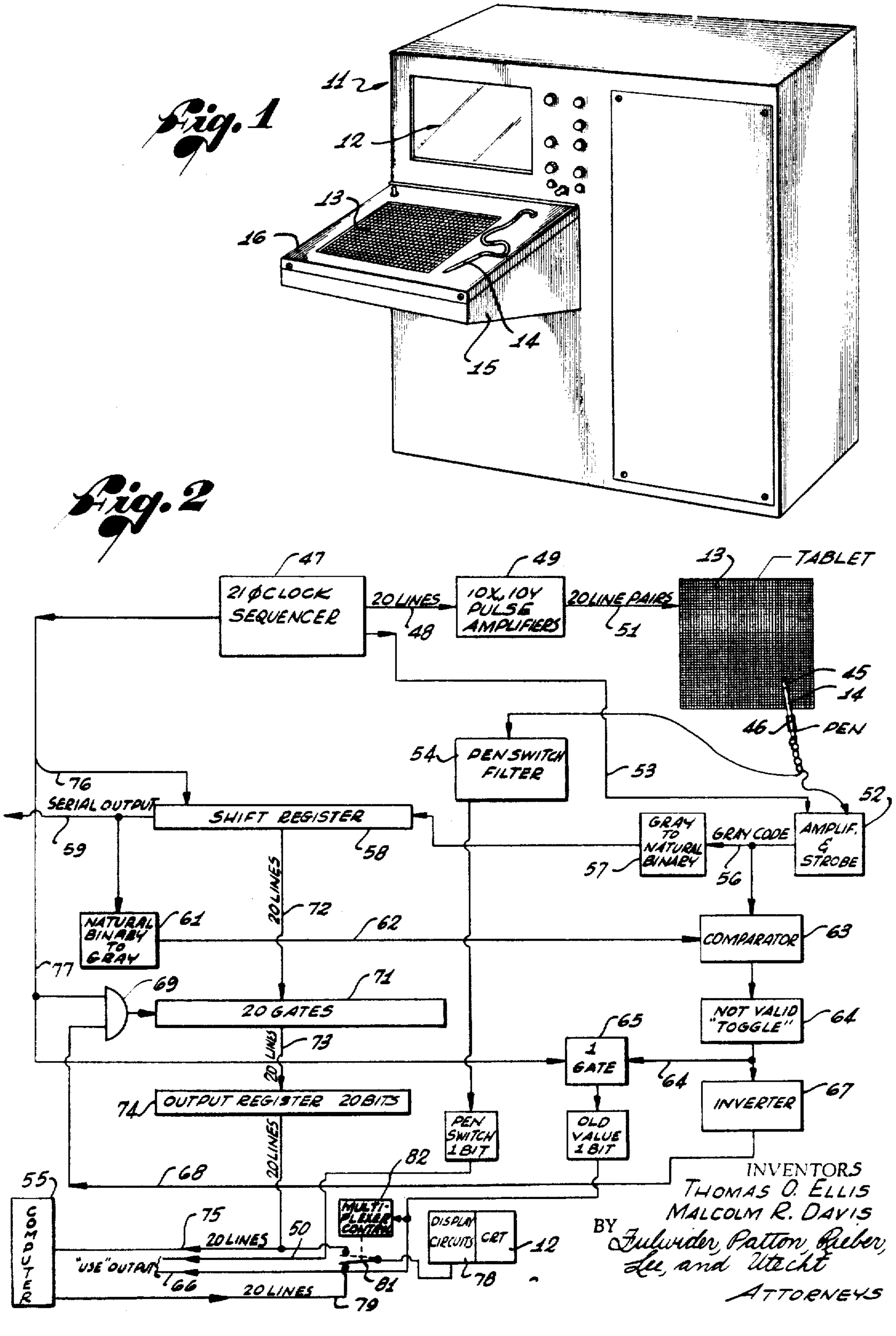
FIGURE 1 is a perspective view of the exterior of a system device according to the present invention showing a mounting cabinet for the digital computer and input hardware, a local cathode ray tube, and the writing tablet and stylus.
FIGURE 2 is a logic diagram for the system.

FIGURE 1 illustrates a unitary embodiment of the system of the present invention in which the graphic input elements and a digital computer of serial or parallel input type are enclosed in a cabinet 11 which also encloses a local cathode ray tube 12 with its face exposed through a cabinet window. A graphic input tablet 13 and a "writing" stylus 14 are shown mounted on a ledge 15 with the tablet disposed beneath a cover frame 16 exposing the surface of only the active portion of the tablet. It will, of course, be understood that the tablet 13 and stylus 14 need have only electrical connections to the graphic input elements and to the computer and need not be associated physically therewith. The tablet 13 may likewise be mounted in any position but is desirably horizontal or inclined, as in a desk surface, to follow the normal and customary location of a writing surface, so that the use of the stylus 14 on the tablet 13 will simulate normal writing with a pen or pencil in physical movements. The computer output may be fed to any number of remote display tubes or other devices.

A trace of the stylus movements may appear on the cathode ray tube 12 and users normally adjust within a few minutes to the conceptual superposition of the display trace and the actual stylus movement. It has been found that this accommodation permits writing, printing, constructing figures and signatures to be accomplished as easily as when done with a conventional pen or pencil. This accommodation is increased by the naturalness of a stylus wherein a pressure-sensitive switch installed in its tip indicates stroke or intended input information to the computer and is actuated by approximately the same pressure normally used in writing with a pencil. As a matter of fact, the user soon finds the separation of the display screen and writing tablet to be convenient in that no part of the display surface is covered by the physical pen or user's hand.

The logic diagram of FIGURE 2 is illustrated for a tablet employing ten pairs of encoding drive lines for each of the X and Y axes. In a binary system, this gives 1024 conductors for each axis of the tablet and at 100 conductors to the inch, results in a tablet with an active surface in the form of a square with 10.24 inches on each side. In addition, a general purpose tablet embodiment of the invention utilizes a pair of borders about the active portion of approximately one-half inch width each, with an "active" border, immediately adjacent the active portion of the tablet, energized the same as the active edge of the tablet and a "guard" border, outside of the active border, energized oppositely thereto. The metal frame 16 about the tablet desirably covers the guard border and goes slightly over into the active border.

Figure 3:
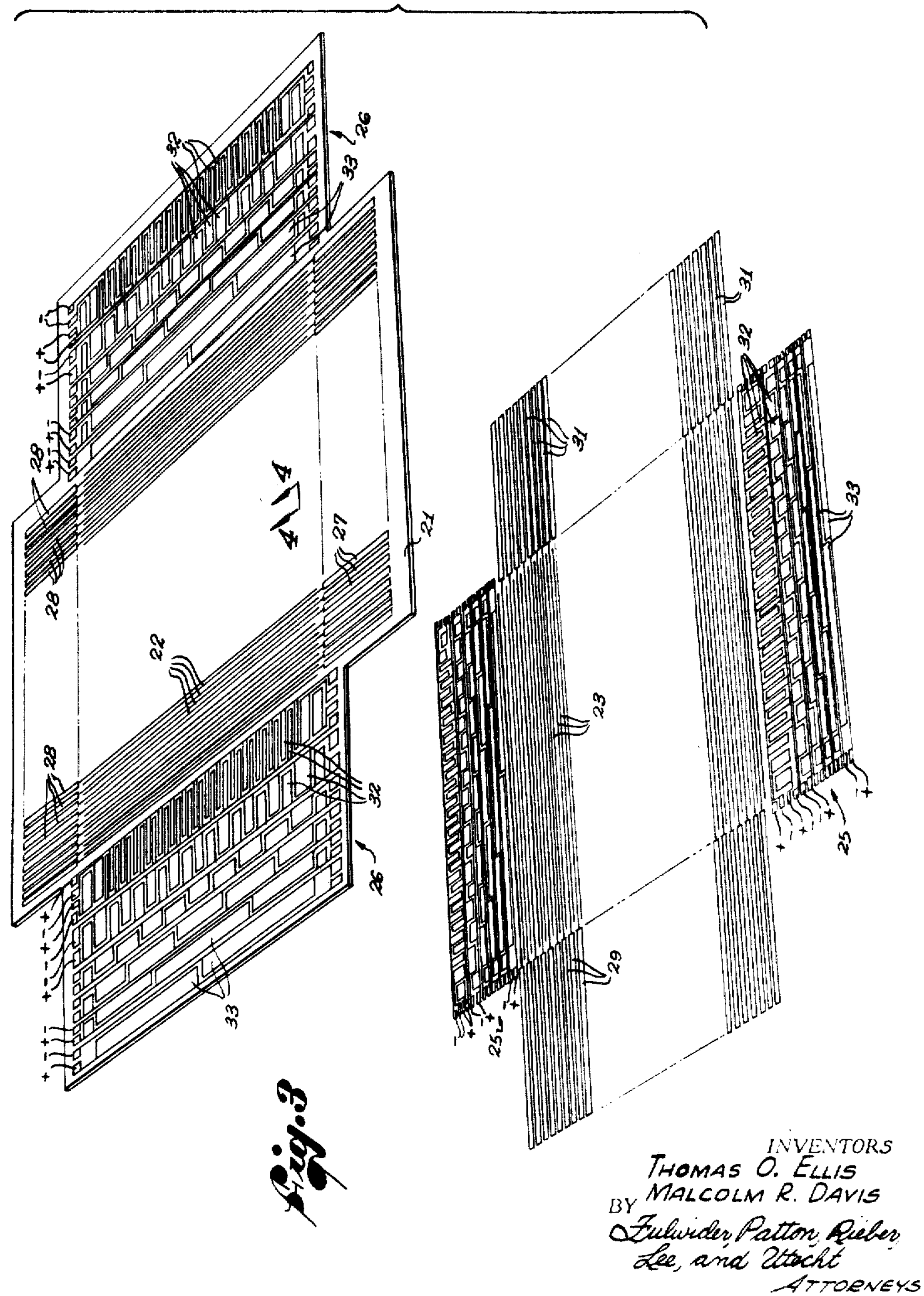
FIGURE 3 is an exploded, perspective view of the tablet with the lower set of coordinate conductors and the coupling and encoding pads for the upper conductors moved downwardly from the under surface of the insulating sheet on which they are mounted.

While the tablet of FIGURE 3 should preferably show ten pairs of drive lines for each axis, the limitations of patent drawings have made it desirable to limit the showing to six pairs of drive lines which, however, will serve to illustrate the principle of construction of the tablet. It will be understood that the formation of a ten pair drive line tablet to conform to the logic diagram of FIGURE 2 will follow the structural arrangement of FIGURE 3 with with an expansion of the encoding pads to sets of ten rather than the six illustrated. This does not mean that six or any other number of pairs of drive lines are not contemplated within the scope of the present invention, since such a number may be desirable in certain applications, as where the selectivity provided by 100 conductors to the inch is not desired and a coarser conductor disposition is used, or where a smaller active tablet is desired. An example of the last-mentioned would be in a signature tablet for use, for example, in banks and in security identification to compare a "live" signature with one recorded at a remote location. In such case, the active tablet need be only large enough to receive an ordinary signature.

Referring now to FIGURES 3, 4 and 4*a*, the structure of the six pair of drive lines per axis tablet therein illustrated will be described. The tablet conductors and encoding pads are mounted on opposite sides of an insulating sheet 21 of any desired material, for example, Mylar, of 0.0005 in. thickness. The opposite surfaces of the insulating sheet 21 are clad with conducting material, for example, copper, approximately 0.0006 in. thick. Both surfaces of the copper-clad insulating sheet are then coded with photo-resist, exposed to art work patterns, and etched using standard fine line etching techniques. The result is a printed circuit on each side of the insulating sheet in proper registration with each other. FIGURE 3 is a showing of a tablet so prepared and before it has been packaged, but showing the connection and pulse polarity of the drive lines thereto.

Referring to FIGURE 4, the upper conductors of the tablet are shown at 22 and the lower conductors at 23, on opposite faces of the insulating sheets 21 and the superposed sets extending at right angle coordinate axes. The tablet conductors are, in the 100 line to the inch example, approximately 0.003 in. wide and spaced on 0.01 in. centers and approximately 0.0006 in. thick. It will be understood that these and all other dimensions and materials given herein are by way of example only and are in no way to be considered as limiting on the scope of the invention.

FIGURE 4*a* is a sectional view similar to FIGURE 4, but showing the tablet 13 mounted on a supporting surface 20 of insulating material and with a coating of epoxy resin or similar material 24 placed over the upper tablet conductors 22 to provide a wear surface over which the stylus tip travels. The coupling between the stylus tip pick-up and the tablet conductors is therefore through the surface material 24 to the upper conductors 22, and through both the surface material 24 and the insulating sheet 21 to the lower conductors 23.

The tablet conductors 22 on the top surface of the insulating sheet 21 are driven from encoding pads 25 on the bottom surface of the insulating sheet, with the encoding pads 25 capacitatively coupled to the upper conductors 22 through the insulating sheet. Likewise, the lower conductors 23 are driven by the encoding pads 26 on the upper face of the insulating sheet 21 and capacitatively coupled to the conductors through the insulating sheet. The conductors 22, 23 may be driven from either or both ends. In the tablet shown in FIGURE 3, conductors are alternately driven from opposite ends to permit widening of the conductors at their ends to secure a greater coupling area between individual conductors and coupling pads. If all conductors were driven from the same end only, a similar effect could be secured by making the then narrow coupling portions of the conductors much longer. In the embodiment illustrated in FIGURE 3, alternate conductors 22 are extended at opposite ends beyond the active area of the tablet at 27 and 28. Likewise, the conductors 23 are extended, alternate conductors to opposite ends, at 29 and 31. In the specific dimensional example given, these extensions 27, 28, 29 and 31 may be approximately 0.016 in. wide and disposed on 0.020 in. centers.

Since the lower conductors 23 are spaced a greater distance from the stylus pick-up tip than, and are shielded by, the conductors 22, the extensions 29, 31 are desirably made longer than the extensions 27, 28 and the encoding pads 26 are likewise made wider than the encoding pads 25 to supply greater coupling area between the pads and conductors of the lower level to drive the lower conductors with greater intensity so that the resulting signal strength at the stylus tip is substantially the same for the conductors on both axes.

In the encoding of the tablet conductors in the Gray binary code, for those which change more frequently with conductor position (which is natural binary might be referred to as least significant, a term which has no meaning in the Gray binary code), there is local cancellation of the fields between adjacent conductors which decreases the strength of the signal picked up by the stylus. To strengthen these signals against such local field cancellation, the corresponding encoding pads at 32 have a greater width than the encoding pads, as at 33, which give a driving encoding where the binary bit changes less frequently with stylus movement.

There is therefore a construction in the specific embodiment illustrated in FIGURE 3 in which the coupling areas between the driving and encoding pads and the tablet conductors are greater for the bottom conductors than for the top conductors for all comparable encoding relationships and in which, for both top and bottom conductors, there is a greater coupling area provided for the encoding pads where the identifying binary bit changes more frequently with conductor position.

While the tablet conductors could be encoded in natural binary and other codes, this can complicate the electrical circuitry if it is desired to secure unambiguous binary information of the stylus position. For example, in natural binary, the movement of the stylus from one conductor to another may effect change in a large number of bits, and the ambiguity in the identification of the stylus position may be of great magnitude. A Gray binary code is preferably selected for encoding the tablet conductors wherein only one bit changes value with each conductor position, thus giving a complete and unambiguous determination of the stylus position on the tablet.

Desirably a reflected Gray binary code is used to facilitate serial conversion to natural binary. This also facilitates comparison between the Gray number of a new scan and the Gray number of an old scan and if they differ in more than one bit, in either the X or Y axis, a non-valid toggle is set to indicate an error. If in immediately succeeding cycles the Gray numbers for an axis position should differ in more than one bit, the indication is that the stylus has moved more than one line during the cycle, and since this is improbable under normal usage with the selected scanning speed, it is assumed that an error has occurred. In practice, a validity check detects errors only rarely when the stylus is in contact with the tablet, but may be used to suppress a display of the stylus position as it is lifted off the tablet.

The selected Gray binary encoding in the embodiment of FIGURE 3 works out with the encoding pads where the binary bit changes least frequently with tablet position two in number, pulsed positively and negatively for binary bits 1 and 0, and each covering half the tablet across the major axis under consideration. In the next phase, a central encoding pad of half tablet length occupies the central portion and there are two end encoding pads of half this length. In the following phase the central encoding pads are of the same length as the end pads in the previous phase and the end pads in the phase under consideration are one-half the length of the central pads. This continues throughout the encoding pads down to those for the conductor encoding, where the bit changes most frequently with tablet position, with each successive phase utilizing central pad lengths the same as in the end pads of the preceding phase, and each phase using end pads of one-half the length of its central pads. With this arrangement a change in the position of the stylus pick-up from one tablet conductor to the next adjacent tablet conductor can involve a change of no more than one bit in the complete Gray number for one coordinate axis.

FIGURE 5 illustrates an idealized time sequence of signals as they might appear at the output of the stylus amplifier for a given location of its tip pick-up. The tablet wires are driven successively in the encoding pattern selected, with the horizontal wires driven first and the vertical wires immediately thereafter to complete an encoding scan identifying the stylus position, and then a short "housekeeping" period is provided before a new major cycle is initiated. The top line 41 in FIGURE 5 shows the timing pulses from a clock sequencer, to be hereinafter described, and indicating twenty-one timing periods in a major scanning cycle. The energization of a particular X axis conductor "N" as it would appear on a stylus pick-up is shown on line 41, there being a series of ten pulses of polarities determined by the conductor position and the encoding pattern used. Immediately after the tenth driving pulse to the X conductors, the first driving pulses to the Y axis conductors are initiated and the line 42 indicates the complete scan energization of a Y axis conductor "M." After the twentieth phase timing pulse, corresponding to the tenth drive pulse for the Y conductors, a short housekeeping period is provided for, and then the cycle begins again with the pulsing of the X axis conductors. The line 44 of FIGURE 5 shows an informational pulse given at the end of the twenty pair pulse energization for one complete scanning of the X and Y axis conductors.

Any desired speed for the major cycle may be selected, preferably such that with the stylus moved rapidly across the surface of the tablet, several complete sets of positional data are obtained for each tablet conductor. With a tablet conductor arrangement of 100 conductors to the inch, it has been found suitable to energize the conductors in pulses of one microsecond duration at intervals of ten microseconds between phases or differently encoding pairs of pulses. The arrangement illustrated in FIGURE 5 also provides twenty microseconds for "housekeeping" between the last pulses to the Y axis conductors to end the scan and the first pulses to the X axis conductors to begin the next major cycle, thereby completing a major cycle each 220 microseconds. With the values given in the example, it has been found that an average of two or three complete sets of positional data are obtained for each tablet conductor with the stylus swept rapidly across the surface of the tablet. For more positive identification of the bit value, it is desirable that the pulsing of the tablet conductors be effected both positively and negatively for the 1 and 0 bits of the binary encoding selected.

FIGURE 2 is a logic diagram of the digital computer and graphic input system according to the present invention using a tablet with approximately 1024 conductors in each of the X and Y axes of its active portion, and ten pairs of driving conductors for each axis, encoding the conductors in a Gray binary code. The stylus 14 has both its signal pickup tip and tip pressure sensitive switch illustrated diagrammatically at 45. The body of the stylus contains a high input impedance amplifier diagrammatically illustrated at 46. A twenty-one phase clock sequencer 47 feeds twenty of the timing pulses of line 41 of FIGURE 5 in sequence across twenty lines 48 to blocking oscillator amplifiers 49, various halves of whose outputs are represented by the pulses shown on lines 42 and 43 of FIGURE 5 and actually in the form of positive and negative paired pulses fed across twenty pairs of lines 51 to the encoding pads 25 and 26 of the tablet.

The stylus 14 in a given position picks up a series of pulses in accordance with lines 42 and 43 of FIGURE 5, by its preferred capacitative coupling to the nearest energizing conductors, these pulses are transmitted to an amplifier and strobe device 52 to which a strobe pulse is also fed on line 53 from the clock sequencer 47 each time an encoding pulse is fed over one of the lines 48. The pulses over the line 53 are delayed slightly so as to catch the pen response to tablet conductor energization at its peak. A signal of the closing of the stylus tip pressure switch is sent through a filter 54 to a parallel input computer 55 to give information to the computer that the stylus is in cooperating relationship on the tablet and in this respect the information fed to the computer has significance.

The pulses from the amplifier and strobe 52 are fed over line 56 to a Gray binary to natural binary converter 57 and the natural binary coded pulses are fed as binary bits into a shift register 58. Information to a serial input computer may be taken directly from shift register 58 on line 59 or, without verification, from the converter 57. The serial output from the shift register 58 is fed to a natural binary to Gray binary converter 61 and the output of the converter 61 is the Gray binary bits resulting from the immediately previous scanning cycle. These are fed over line 62 to a comparator 63 where they are compared with Gray binary bits from line 56 of the current scanning cycle. If the new cycle Gray binary number of the stylus position on either the X or Y axis differs from the immediately preceding cycle Gray binary number of stylus position by more than one bit, a signal is given by the camparator to set a "not-valid" toggle 64 which thereby feeds from line 64 through gate 65 to the computer on line 66 to instruct the computer that the information it is receiving is old information, the new, erroneous information being cut off as now described. The signal from the not-valid toggle 64 is also fed to an inverter 67 and thence on line 68 to an AND gate 69 where the signal inversion deactivates the twenty parallel gates 71 and prevents the parallel feeding of the bit information in the shift register 58 over lines 72 and 73 to the output register 74 which normally feeds to the computer 55, over lines 75, the natural binary number of the stylus position on the tablet as determined in the immediately completed scanning cycle.

A command to the shift register 58 to transmit its bit information in parallel to the output register 74 is given to the shift register from the clock sequencer 47, over line 76, during the housekeeping period in the major cycle, as for example, by the pulse in line 44 of FIGURE 5. The clock sequencer 47 also gives a signal over line 77 to both the AND gate 69 for the gates 71 and to the gate 65 for the validity information fed to the computer. The output register 74 feeds its bit information as a parallel input to the computer 55. During the housekeeping period, the clock sequencer 47 will feed additional pulses to various elements of the system to effect clearing thereof after termination of a major cycle, in preparation for new information to be transmitted in a new scanning cycle.

The local cathode ray tube 12 is fed through display circuits 78, principally by a computer or output over the lines 79 through a multiplexer switch 81 operated by a control 82. The control 82 has its own internal timing set-up for operating the switch 81 and also receives information of the old value bit from the not-valid toggle to prevent operation of the multiplexer switch when an error occurs in the stylus position number. The multiplexer switch periodically interrups the computer output and takes local stylus position information from the lines 75 with sufficient frequency to maintain a bright dot representation of the sylus position on the local cathode ray tube 12. Satisfactory operation has been secured by changing the multiplexer switch 81 to the local lines 75 every five milliseconds for a duration of fifty microseconds.

No attempt has been made to show computer outputs other than back to the local cathode ray tube 12. It will be understood that the computer may likewise feed from lines 79 to remote cathode ray tubes for live, instantaneous display of the graphic input information at remote points. The computer may likewise feed the information to its permanent memory and indefinite storage for later retrieval and use of the stylus trace information. The device has been found to be particularly valuable in application where its excellent linearity and accuracy are important. It provides a greatly improved and "natural" means of communication between man and a computer.

Many specific uses for the system of the present invention will be apparent, among which may be cited the instantaneous transmission of analog representations, whether writing, drawing or whatever; in making additions to or variations in maps, contour lines and other survey representations which may be transmitted to a computer map memory for varying or adding to previous information In analysis of or printing out maps; for comparison of signatures in banking and security identifications to detect forgery; and the capacity coupling between the stylus tip and the tablet conductors permits the ready tracing of analog representations on paper or link non-conducting sheet placed on the tablet surface. Many other uses employing instantaneous transmission or digital storage will become readily apparent upon use of the device, and many variations will likewise become apparent, such as the projecting of an image onto the back surface of a translucent tablet to be viewed by the user and correlated with his stylus movement.

While certain preferred embodiments of the invention have been specifically illustrated and described, it will be understood that that invention is not limited thereto, as many variations in addition to the above will be apparent to those skilled in the art, and the invention is to be given its broadest interpretation within the terms of the following claims.

We claim:

1. A digital computer and graphic input system comprising: an electrical tablet; means energizing said tablet in accordance with a binary coding cycle in order to define coordinates of the tablet by a series of binary bits; stylus means cooperating with said tablet and movable in an analog trace thereover, said stylus means including pick-up means responsive to the energization of said tablet and having an output of a series of binary bits identifying the position of the stylus on the tablet surface; a digital computer; means feeding said stylus means output into the computer for storage therein, said computer providing an output representative of the path traced by said stylus means; a cathode ray tube separate from said tablet and stylus means but located adjacent thereto so as to be visible to the user of the tablet and stylus; and means for feeding the output of said computer to said cathode ray tube to establish a local representation of the path traced by the stylus means for the user's view as he operates the stylus means.

2. A digital computer and graphic input system comprising: an electrical tablet; means energizing said tablet in accordance with a binary coding cycle in order to define coordinates of the tablet by a series of binary bits; stylus means cooperating with said tablet and movable in an analog trace thereover, said stylus means including pick-up means responsive to the energization of said tablet and having an output of a series of binary bits identifying the position of the stylus on the tablet surface; a digital computer; means feeding said stylus means output into the computer for storage therein, said computer providing an output representative of the path traced by said stylus means; a cathode ray tube separate from said tablet and stylus means but located adjacent thereto so as to be visible to the user of the tablet and stylus; and means for feeding the output of said computer to said cathode ray tube to establish a local representation of the path traced by the stylus means for the user's view as he operates the stylus means; and means for periodically feeding the stylus means output directly to said cathode ray tube to establish an illuminated spot indicative of the instantaneous position of the stylus on the tablet surface, independent of the computer output.

3. The system defined in claim 1 in which said tablet comprises a set of insulated conductors disposed in a common plane in parallel relation with one coordinate axis and a second set of insulated parallel conductors disposed in superposed relation to said first set of parallel conductors in another coordinate axis; said means for energizing said tablet sequentially energizing the conductors of said sets in accordance with the binary coding cycle; and said pick-up means on said stylus means being capacitatively coupled to said conductors to be energized in accordance with the energization of the conductors at which the pick-up is located during the cycle.

4. The system defined in claim 3, including: encoding pads arranged according to said binary coding and capacitatively coupled to said tablet conductor and separately energized in sequence, whereby said stylus pick-up receives binary bit information of its location in accordance with the energization of the coordinate conductors thereat.

5. The system defined in claim 4 in which said encoding pads have a greater area for coupling to the lower set of coordinate conductors, whereby the field strengths of the upper and lower conductors at the stylus pick-up are substantially equalized.

6. The system defined in claim 4 in which the encoding pads have a greater coupling area for energizing the conductors in the phase in which the binary bits change most rapidly with conductor position on the tablet whereby to strengthen the field strength of the energized conductors to compensate for local cancellation from adjacent conductors.

7. In combination: a digital computer; an electrical tablet made up of a plurality of insulated conductors including superposed sets of parallel conductors arranged parallel to X and Y axes; means for energizing said conductors cyclically according to a binary coding pattern to indicate by a succession of binary bits the position of a given conductor in the X axis and to likewise indicate by a plurality of binary bits the position of a given conductor in the Y axis; a stylus movable across the surface of said tablet to form an analog trace; pick-up means on said stylus cooperating with the energized conductors in the tablet to give an output from the stylus of a plurality of binary bits identifying the instantaneous position of the stylus on the tablet; means feeding said stylus output into said computer to establish a record of the movements of the stylus across the tablet surface; a cathode ray tube positioned adjacent said tablet and stylus; and mean for feeding an output from said computer to said cathode ray tube to present to view on the tube surface a tracing of the analog path made by the stylus across the tablet surface.

8. In combination: a digital computer; an electrical tablet made up of a plurality of insulated conductors including superposed sets of parallel conductors arranged parallel to X and Y axes; means for energizing said conductors cyclically according to a binary coding pattern to indicate by a succession of binary bits the position of a given conductor in the X axis and to likewise indicate by a plurality of binary bits the position of a given conductor in the Y axis; a stylus movable across the surface of said tablet to form an analog trace; pick-up means on said stylus cooperating with the energized conductors in the tablet to give an output from the stylus of a plurality of binary bits identifying the instantaneous position of the stylus on the tablet; means feeding said stylus output into said computer to establish a record of the movements of the stylus across the tablet surface; a cathode ray tube positioned adjacent said tablet and stylus; means for feeding an output from said computer to said cathode ray tube to present to view on the tube surface a tracing of the analog path made by the stylus across the tablet surface; and means for feeding the output of said stylus into said cathode ray tube independently of the computer to illuminate a spot showing the instantaneous position of the stylus on the tablet.

9. In combination: a digital computer; an electrical tablet made up of a plurality of insulated conductors including superposed sets of parallel conductors arranged parallel to X and Y axes; means for energizing said conductors cyclically according to a binary coding pattern to indicate by a succession of binary bits the position of a given conductor in the X axis and to likewise indicate by a plurality of binary bits the position of a given conductor in the Y axis; a stylus movable across the surface of said tablet to form an analog trace; pick-up means on said stylus cooperating with the energized conductors in the tablet to give an output from the stylus of a plurality of binary bits identifying the instantaneous position of the stylus on the tablet; means feeding said stylus output into said computer to establish a record of movements of the stylus across the tablet surface; a cathode ray tube positioned adjacent said tablet and stylus; means for feeding an output from said computer to said cathode ray tube to present to view on the tube surface a tracing of the analog path made by the stylus across the tablet surface; means for feeding the output of said stylus into said cathode ray tube independently of the computer to illuminate a spot showing the instantaneous position of the stylus on the tablet; switching means for controlling which of the computer and stylus outputs is fed to the cathode ray tube; and means operating said switching means to pass the stylus output directly to the cathode ray tube at the minimum frequency and for the minimum time required to establish and maintain the illuminated spot stylus position.

10. A graphic input device comprising: an electrical tablet including an insulated wire screen having the wires thereof substantially parallel in sets and the sets disposed at right angles in accordance with X and Y axes; an electrical stylus cooperating with the surface of said tablet to trace an analog path thereover; pickup means adjacent the tip of said stylus and capacitatively coupled to the tablet wires thereunder; means capacitatively coupled to said tablet wires for cyclically energizing the wires of each set in accordance with a binary coding pattern; a cathode ray tube disposed adjacent said tablet in the view of a user; and means feeding the output of said stylus pickup to said cathode ray tube to establish an illuminated spot representing the instantaneous position of the stylus pick-up on the tablet.

11. The electrical tablet defined in claim 6 in which said energizing conductors provide a greater coupling area for the encoding phase in which the bit value changes most rapidly with physical location across the tablet so as to minimize local cancelling from adjacent wires.

References Cited

UNITED STATES PATENTS

| | | | |
|---|---|---|---|
| 3,183,485 | 5/1965 | Cubbage | 340—173 |
| 3,342,935 | 9/1967 | Leifer et al. | 178—19 |

JOHN W. CALDWELL, *Primary Examiner.*

A. J. KASPER, *Assistant Examiner.*